United States Patent [19]
McDonald et al.

[11] Patent Number: 5,199,011
[45] Date of Patent: Mar. 30, 1993

[54] APPARATUS FOR ATTENUATING OPTICAL CROSSTALK INDUCED COMPONENTS OF A FOCUS ERROR SIGNAL IN AN OPTICAL DISK DRIVE

[75] Inventors: James C. McDonald, Bellvue; Gregory V. Hofer, Loveland, both of Colo.

[73] Assignee: Hewlett-Packard Company, Palo Alto, Calif.

[21] Appl. No.: 739,926

[22] Filed: Aug. 2, 1991

Related U.S. Application Data

[63] Continuation-in-part of Ser. No. 466,165, Jan. 17, 1990, abandoned.

[51] Int. Cl.[5] .............................................. G11B 7/00
[52] U.S. Cl. ................... 369/58; 369/44.34; 369/44.27
[58] Field of Search ............... 369/58, 44.26, 44.27, 369/44.28, 44.25, 44.32, 44.34; 250/201.5

[56] References Cited

U.S. PATENT DOCUMENTS 4,707,648 11/1987 Minami ..................... 369/44.34
4,730,294 3/1988 Funada .................... 369/44.26
4,747,089 5/1988 Eguchi et al. .............. 369/44.32

Primary Examiner—Aristotelis Psitos
Assistant Examiner—P. W. Huber
Attorney, Agent, or Firm—William W. Cochran, II

[57] ABSTRACT

An apparatus for attenuating optical crosstalk induced components of a focus error signal in an optical disk drive of the type having a grooved optical disk with servo tracks and tracking and focus servo systems controlled by a digital signal processor. A calibration operation is performed whenever a new disk is inserted into the track. During the calibration operation, the disk is scanned about a tracking axis at a track crossing frequency greater than the focus servo system bandwidth. The focus error signals produced when the disk is scanned are filtered about a pass band including the track crossing frequency. Crosstalk values equal to values of the filtered focus error signals are determined as a function of corresponding values of the tracking error signals, and are stored in memory. A correction operation is performed while reading and writing data on the disk. During the correction operation, the crosstalk values are read from memory as a function of corresponding values of the tracking error signals, and summed with the focus error signals.

3 Claims, 4 Drawing Sheets

APPARATUS FOR ATTENUATING OPTICAL CROSSTALK INDUCED COMPONENTS OF A FOCUS ERROR SIGNAL IN AN OPTICAL DISK DRIVE

CROSS-REFERENCE TO RELATED APPLICATIONS

This application is a continuation-in-part of U.S. patent application 07/466,165 filed Jan. 17, 1990 by James C. McDonald and Gregory V. Hofer, now abandoned.

BACKGROUND OF THE INVENTION

1. Field of the Invention

The present invention relates generally to data storage and more particularly to optical disk drive tracking and focus servo systems.

2. Description of the Prior Art

Magneto-optic data recording technology combines the erasability features of magnetic data storage systems with the high data storage capacity of optical systems. Current 5.25 inch magneto-optic disk can hold up to 600M bytes of information, 1000 or more times the amount of information that a similarly sized magnetic floppy diskette can store. Future media will hold considerably more data. Magneto-optic disks are also transportable and can be transferred between drives. Since the reading, writing and erasing operations are performed with light beams in combination with magnetic fields, they have long life, high reliability, and are relatively immune to physical wear.

The principles of magneto-optic technology are well known. Information is digitally stored at bit positions on a magneto-optic disk. The orientation of the magnetic field at each bit position can be switched between a first, or digital one state, in which its north pole is oriented upward, and a second, or digital zero state, in which the magnetic field is reversed and the north pole oriented downward. The orientation of the magnetic field at each bit position is selected by subjecting the bit position to a magnetic field of the appropriate polarity, and heating the bit position of the disk by the laser beam of write or erase intensity. The magnetic orientation of the bit position is "frozen" when the laser beam of write or erase intensity is removed and the disk cools and returns to room temperature after the laser is turned off.

The magnetic fields of all bit positions in an unwritten disk will generally be oriented with north poles down to represent digital zeros. When writing information, the bit positions will be subjected to a write magnetic bias field and heated by a high (write) intensity laser beam. The orientation of the magnetic fields at the written bit positions will reverse to north poles up. Bit positions are erased by subjecting them to an erase bias field of the opposite polarity, and again heating the bit position. The magnetic field orientation at the erased bit positions will then reverse and switch to north poles down.

Data is read from the optical disk using a low-power or read intensity laser beam. Because of the magneto-optic phenomenon known as the Kerr Effect, the polarization of a laser beam impinged upon the bit positions will be rotated as a function of the magnetic orientation of the bits. The polarization of laser beam portions reflected from bit positions on the optical disk is detected by opto-electronic detector circuitry. Signals from the detector circuitry are then processed to determine whether the bit position is representative of a digital one or zero.

Bit positions are aligned adjacent one another in an elongated servo track in a groove on the optical disk (media). The optical disk can include a single servo track which is spirally positioned on the disk, or a plurality of concentrically positioned servo tracks. The groove or grooves in which the servo tracks are positioned are separated by land portions. The laser beam used to read, write and erase data at the bit positions is focused onto the disk by an objective lens. Optical disk drives of this type typically include a focus servo system for driving the objective lens about a focus axis to keep the laser beam focused on the disk. A tracking servo system is used to drive the objective lens along a tracking axis perpendicular to the servo tracks and to maintain the laser beam centered over a desired servo track.

Tracking and focus servo systems for optical disk drives are generally known and illustrated, for example, in the Silvy et al. U.S. Pat. No. 4,700,056 which is specifically incorporated herein, by reference, for all that it teaches. After the laser beam has been modulated by the individual bit positions, it is reflected from the optical disk and impinges upon an optical detector typically having four or more separate detector sections arranged in a geometric pattern. Circuitry coupled to the optical detector produces both tracking and focus error signals. The focus error signal is generally sinusoidally shaped and has a magnitude and polarity which represent the distance and direction, respectively, from which the objective lens is displaced from proper focus. Similarly, the tracking error signal is a generally sinusoidal signal having a magnitude and polarity representative of the distance and direction by which the laser beam is offset from the center of a desired servo track.

The focus and tracking error signals are processed by the servo systems while operating in closed loop modes to generate focus and tracking drive signals. The focus and tracking drive signals are applied to respective actuators or motors and cause the objective lens to be driven to a position which minimizes the focus and tracking errors.

The focus and tracking servo systems have a limited response time in which they can respond. Servo errors or disturbances that generate required response times that are less than the response time of the servo system results in little or no closed-loop response by the system. This results from the limited ability of the mechanical system to make physical corrections. The error signal generated by the control servo system can be compensated by lag-lead and/or lead-lag filters for proper frequency characteristics before being applied to the actuator as a drive signal.

Typical processing steps performed on the focus and tracking error signals include the addition of an offset value to compensate for electrical, optical and/or mechanical characteristics of the drive and the multiplication factor for the error signal by a gain factor to control servo system response time.

A well known source of error in the focus servo loop is the introduction of a false focus error signal as a result of optical crosstalk. Errors in the focus servo loop caused by optical crosstalk degrade the overall performance of the disk drive. Optical crosstalk is a result of diffraction patterns formed from the different phase relationships of reflected light from the uneven surface of the grooved media. The reflected light and diffraction patterns impinge upon all sections of the optical detector. As a result of this distortion, or "optical crosstalk", changes in tracking position cause changes in the focus error signal.

The tracking error signal (TES) 1 illustrated in FIG. 1 to a first approximation, can be represented by the equation:

$$TES = A \cdot \sin(180^\circ X/0.8) \quad \text{Eq. 1}$$

In Equation 1, the variable A represents the peak amplitude of the tracking error signal 1. The number 0.8 represents half the track pitch (i.e., half the distance between centers of adjacent servo tracks). The variable X represents the difference, either plus or minus (+/−), between the center of the track and the location of the optical beam on the track.

The actual focus error signal (FES) is comprised of a "true" focus error component and a crosstalk induced component. The focus error signal can be approximated by the following equation:

$$FES = foc(y) + B \sin[(180^\circ X/0.8) + \phi] \quad \text{Eq. 2}$$

In Equation 2, the "true" focus error component is represented by $foc(y)$ and a crosstalk induced component 7 illustrated in FIG. 2 is represented by the sin term. Like the corresponding values in Equation 1, the variable B represents the peak amplitude of the crosstalk induced component 7 of focus error signal 11, 0.8 represents half the pitch of the servo track, while X represents the difference, either plus or minus (+/−), between the center of the servo track and the location of the beam on the track. The variable $\phi$ represents the phase relationship between the tracking error signal 1 and the crosstalk induced component 7 of focus error signal 11.

By knowing the value of B and $\phi$ in Equation 2, it is possible to calculate an approximate value of the crosstalk induced component 7 of the focus error signal 11 as a function of tracking error signal 1. The crosstalk induced component 7 of the focus error signal 11 can be subtracted from the focus error signal 1 to yield an uncontaminated or "true" focus error signal (not shown).

However, predetermination of these parameters is virtually impossible. First, the magnitude of B and $\phi$ are very dependent on the particular media utilized, and vary from vendor to vendor. Typical variation for the value of B from media vendor to media vendor is 2–3 to 1. B and $\phi$ are also dependent to a large degree on the alignment accuracy of the particular optical head used in the drive and sensitive to particulate contaminants that can exist, or collect along the optical path of the optical head. It is also difficult to measure $\phi$. Because of the variability of B and $\phi$ and the difficulty of accurately determining these values, methods which use B and $\phi$ to calculate the crosstalk component of the focus error signal and subtract this component from the focus error signal to obtain a "true" focus error signal are generally not commercially viable.

Other known techniques for reducing the effects of optical crosstalk include improving the quality of the optical systems and improving the optical focusing schemes. These techniques, however, have been impractical because the solution is vendor specific. These techniques are also expensive because of the adjustments and calibration necessary for each disk media used.

An optical focusing method which is said to provide good crosstalk performance under some circumstances is described in a paper entitled "New Focusing Method for Draw-Type Optical Head" by S. Arai, K. Hamada and K. Ogawa, presented at the topical meeting on Optical Data Storage, Oct. 15-17, 1985, in Washington, D.C. which is specifically incorporated herein, by reference, for all that it teaches. This focusing technique uses both a lens offset method and a gain difference method.

From the foregoing description, it is evident that known techniques for reducing focus crosstalk in the focus servo loop require a great deal of time and precision in either the optics manufacture or in calibrating and aligning the detectors. These techniques contribute to the overall expense of the drive. Since the phase shift of reflected light depends among other things on the optical characteristics of the disk, and in particular, variations in track groove depths, previous methods of reducing optical crosstalk have required the use of the particular type of disk media for which the optical disk drive was calibrated. Furthermore, there are other factors which contribute to optical crosstalk such as temperature, aging and contamination on the disk surface which are not compensated for by the previous methods of optical crosstalk reduction.

It is evident that there is a continuing need for improved methods for attenuating optical crosstalk which introduces focus error in the focus servo loop. In particular, what is needed is an efficient and accurate and adaptive technique for eliminating the focus crosstalk component of the focus error signal for any particular media which is in the optical drive.

SUMMARY OF THE INVENTION

The present invention overcomes the disadvantages and limitations of the prior art by providing a system for attenuating optical crosstalk induced components of a focus error signal in an optical disk drive of the type having focus and tracking servo systems. In accordance with the present invention, crosstalk information characterized by the optically induced crosstalk components of the focus error signals is generated and stored. While operating the focus servo system in a closed-loop mode, the crosstalk component of the focus error signal is determined as a function of the tracking error signal. The crosstalk component so determined is then subtracted from the focus error signal, to obtain a true focus error signal. This cost effective method can be quickly implemented by the drive and is not dependent upon the type of disk media used.

The focus error signal is generated while operating the focus servo system in a closed loop mode while the tracks of the optical disk are scanned at a track crossing frequency that generates a crosstalk induced error that has a required response time that is less than one-half the focus servo system response time. The focus error signal produced while the disk is scanned in this manner is filtered by a band-pass filter that is centered appropriately at the track crossing frequency. The values of the resulting filtered focus error signal are stored as a function of the tracking error signals, and used to generate crosstalk values.

DETAILED DESCRIPTION OF THE PREFERRED EMBODIMENTS

Figure 1:
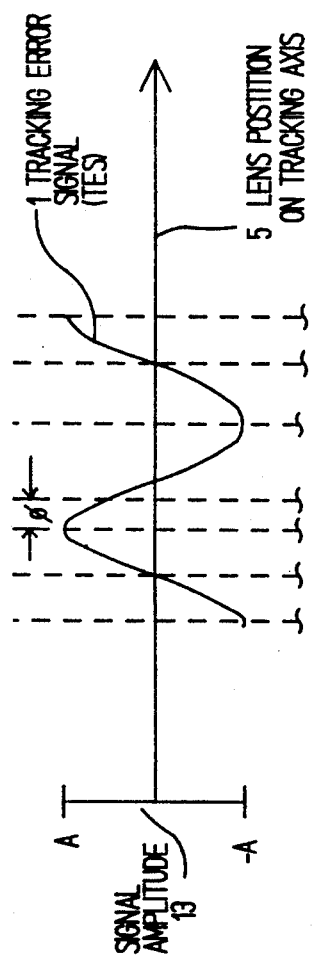
FIG. 1 is a graph of the tracking error signal 1.
Figure 2:
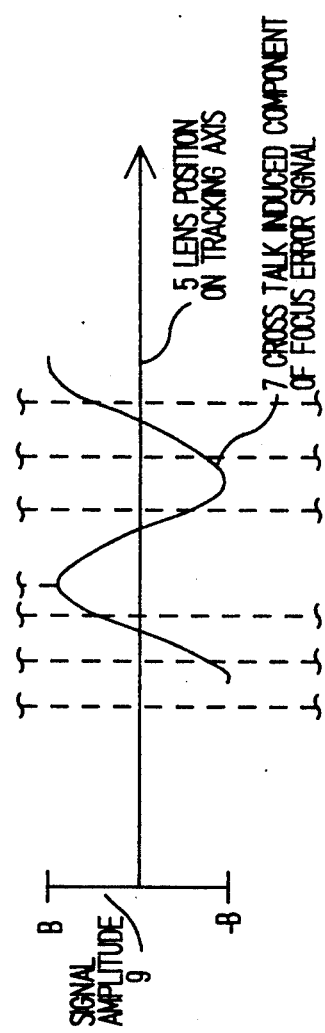
FIG. 2 is a graph of the crosstalk component of the focus error signal.
Figure 3:
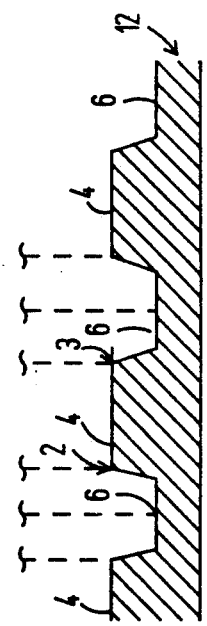
FIG. 3 is a side cut-away view of a portion of the disk media showing contours.

FIGS. 1, 2 and 3 illustrate the relationship between the tracking error signal 1, the crosstalk induced component 7 of the focus error signal 11, and the lens position on the tracking axis. The optical disk media 12 (FIG. 3) has an uneven surface made up servo track 6 or grooved portions, and land portions 4. When the lens of the optical head is centered on either a land portion 4 or a servo track 6, the tracking error signal magnitude (A), as well as the tracking error, are zero. When the lens position transitions from a servo track to a land portion as shown at point 2 (FIG. 3) or a land portion to a servo track as shown at point 3 (FIG. 3), the tracking error signal is at its maximum and minimum values, respectively, as is the tracking error.

FIGS. 1 and 2 also illustrate the relationship between the tracking error signal 1 and the crosstalk induced component 7 of the focus error signal 11. The tracking error signal 1 is illustrated in the graph of FIG. 1 in which the ordinate 3 represents signal amplitude and the abscissa 5 represents the lens position on the tracking axis. The crosstalk induced component 7 of the focus signal 11 is illustrated in the graph of FIG. 2 in which the ordinate 9 represents signal amplitude and the abscissa 5 represents the lens position on the tracking axis. The crosstalk component 7 can be represented to a first approximation by the tracking error signal 1 shifted by phase $\phi$ and scaled by the ratio of the signal amplitudes B/A.

Figure 4:
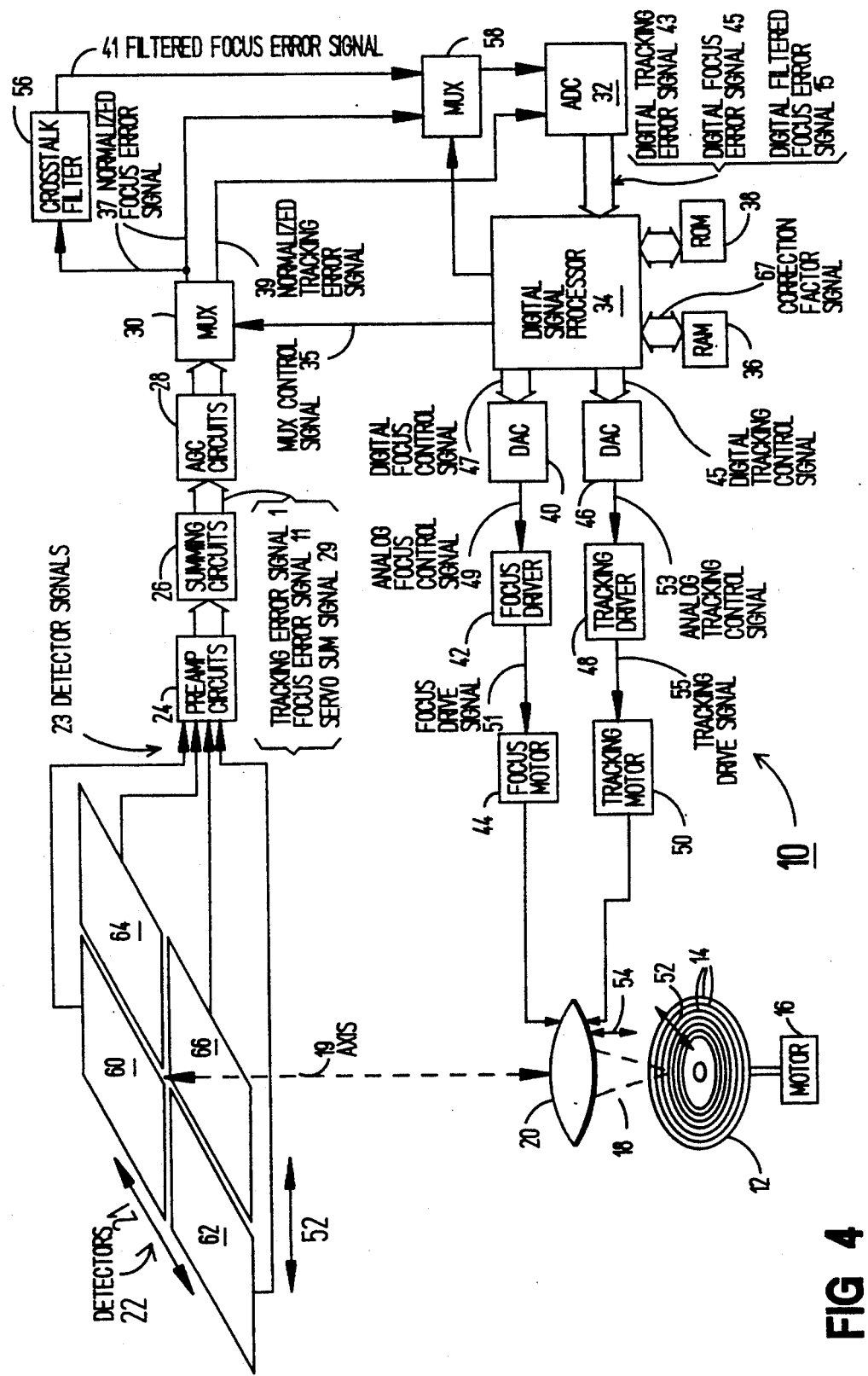
FIG. 4 is a block diagram representation of a magneto-optic disk drive in which the optical crosstalk attenuation technique of the present invention can be implemented.

A magneto-optic disk drive 10 in which the optical crosstalk attenuation system of the present invention can be implemented is illustrated generally in FIG. 4. Disk drive 10 includes a grooved magneto-optic disk 12 which is rotated by motor 16. Digital information is written, read and erased at individual bit positions (not visible) on servo tracks 14 of disk 12 using a laser beam 18. Beam 18 is generated by a laser (not shown) and focused on disk 12 by objective lens 20. When writing or erasing data on servo tracks 14, laser beam 18 is switched to a high, or write intensity level, while a magnetic bias field having the appropriate write or erase polarity, respectively, is applied to the bit positions. Digital information is thereby generated and stored as a function of the magnetic orientation of the bit positions.

Laser beam 18 is switched to a low or read intensity level when information is being read from bit positions on disk 12. After being focused onto servo tracks 14, the polarization angle of the read intensity beam 18 is modulated as a function of the magnetic orientation of the bit positions. The modulated beam 18 is reflected from disk 12 and directed to a pair of detectors similar to detector 22 using a prism beam splitting device so that the axis 19 of the focus beam is aligned at the center point of detectors 22 as shown in FIG. 4. In the illustrated embodiment detectors 22 include four separate sections, or elements 60, 62, 64 and 66. Other detector arrangements can also be used.

Disk drive 10 also includes tracking and focus servo systems for accurately positioning objective lens 20 with respect to bit positions of desired servo tracks 14 at which information is to be written, read or erased. Common elements of both the focus and tracking servo systems include objective lens 20, detector 22, preamp (preamplifier) circuits 24, summing circuits 26, AGC (automatic gain control) circuits 28, MUX (multiplexer) 30, ADC (analog-to-digital converter) 32 and digital signal processor 34 and its associated RAM (random access memory) 36 and ROM (read only memory) 38. Elements specific to the focus servo system include DAC (digital-to-analog) converter 40, focus driver 42, filter 56, MUX 58 and focus motor 44. DAC 46, tracking driver 48, and tracking motor 50 are elements specific to the tracking servo system. The tracking servo system drives and positions objective lens 20 about a tracking axis 52 so as to center laser beam 18 on a desired servo track 14. The focus servo system drives and positions objective lens 20 about a focus axis 54 so as to properly focus laser beam 18 onto magneto-optic disk 12. The closed optical and electrical paths through the tracking and focus servo systems are characterized as servo loops.

After laser beam 18 is focused onto disk 12 and modulated by the bit positions on servo tracks 14, laser beam 18 is reflected back through lens 20 and directed to the center of detector 22 and the center of the other detector that is not shown. Detector signals 23 produced by each of the detector section 60, 62, 64 and 66 are individually amplified by preamp circuits 24 and applied to summing circuits 26. Summing circuits 26 combine the detector signals in a predetermined manner to produce a tracking error signal 1, a focus error signal 11 and a servo sum signal 29.

As shown in FIG. 4, the tracking error signal 1 is produced by summing circuits 26 as a function of the difference, between the sum of the signals from detector sections 60 and 62 and the sum of the signals from detector sections 64 and 66 [i.e. $(60+62)-(64+66)$]. As illustrated in FIG. 1, the tracking error signal 1 has a generally sinusoidal shape with a polarity and magnitude representative of the direction and distance, respectively, that beam 18 is displaced from the center of a desired servo track 14.

The focus error signal 11 is generated as a function of the difference between the sum of the signals from detector sections $60+64$; and the sum of the signals from detector sections $62+66$ [i.e. $(60+64)-(62+66)$]. The focus signal 11 has a generally sinusoidal shape with a polarity and magnitude representative of the direction and distance, respectively, that lens 20 is displaced from its proper focus position.

The servo sum signal, 29 is the sum of the signals from all four detectors (i.e. $60+62+64+66$).

As pointed out in the background of the invention, portions of the tracking error signal 1 tend to contaminate the focus error signal. This is a result of crosstalk induced components of the tracking error signal which are generated by defraction of the laser beam 18 from the grooved surface of the optical media. In simplistic terms, the tracking signal can be thought of as a misalignment of the beam in the left-right direction of detectors 22 (i.e., direction 52, FIG. 4) so that the sum of detectors 64 and 66 will not result in zero value when subtracted from the sum of detectors 60 and 62. When the system is out of focus, detectors 22 will generate non-zero signals from the sum of detectors 62 and 66 minus the sum of detectors 60 and 64. However, crosstalk induced components will cause part of the tracking error signal to contaminate the focus error signal, so that the sum of detectors 62 and 66 minus the sum of. detectors 60 and 64 will not result in a zero signal. This can be the result of optical aberrations, slanting of the disk, dust and other problems in reading the disk, which cause the optical signal to not be uniform in direction 21, even though lens 20 is in focus. The present invention substantially eliminates this contamination of the focus error signal by substantially eliminating crosstalk induced components, to produce a true focus error signal, in the manner set forth below.

Referring again to FIG. 4, the analog tracking error signal 1, focus error signal 11, and servo sum signal 29 are each applied to AGC circuits 28. AGC circuits 28 normalize the tracking error signal 1 and focus error signal 11 by dividing these signals as they are received from summing circuits 26 by the servo sum signal 29. The normalized tracking error signal 39 and normalized focus error signal 37 are individually applied to multiplexer (MUX) 30 from AGC circuits 28. MUX 30 is controlled by digital signal processor 34 by way of MUX control signal 35 which selectively routes the normalized focus error signal 37 to both MUX 58 and crosstalk filter 56, and the normalized tracking error signal 39 to ADC 32. Digital Signal Processor (DSP) 34 co.itrols MUX 58 by selecting either the filtered focus error signal 41 or the unfiltered normalized focus error signal 37 from MUX 30, and supplies the selected signal to ADC 32. During normal disk operation, MUX 58 supplies the unfiltered normalized focus error signal from MUX 30 to ADC 32. Only during the calibration operation illustrated in FIG. 5 in which a controlled seek process is performed, as discussed later, does MUX 58 select the filtered version of the normalized focus error signal 37. ADC 32 digitizes the normalized focus error signal 37, the filtered focus error signal 41 and the normalized tracking error signals 39 to produce a digital tracking error signal 43, a digital focus error signal 45, or, a digital filtered focus error signal 15, and applies them to digital signal processor 34.

Digital signal processor 34 processes the digital tracking error signal 43 and digital focus error signal 45, or digital filtered focus error signal 15, in a predetermined manner in ROM 38. A digital focus control signal 47 is generated as a function of the digital focus error signal 45. The digital focus control signal 47 is applied to DAC 40 and converted to analog form. Focus driver 42 converts the analog focus control signal 49 into a focus drive signal 51 having current characteristics required to drive focus motor 44. In response to the focus drive signal 51, focus motor 44 drives objective lens 20 about focus axis 54, and positions the lens to cause laser beam 18 to be properly focused onto magneto-optic disk 12.

Digital signal processor 34 generates a digital tracking control signal 45 as a function of the digital tracking error signal 43. The digital tracking control signal 45 is converted to analog form by DAC 46 and applied to tracking driver 48. Tracking driver 48 converts the analog tracking control signal 53 into a tracking drive signal 55 which is used by tracking motor 50 to drive objective lens 20 along tracking axis 52, and to center the lens over a desired servo track 14. When operated in the closed-loop manner described above, the tracking and focus servo systems accurately position objective lens 20 so data can be reliably written, read and erased at bit positions of disk 12.

Preamp circuits 24, summing circuits 26, AGC circuits 28, MUX 30, MUX 58, ADC 32, crosstalk filter 56, DACs 40 and 46, focus drivers 42 and tracking driver 48 can be configured from discrete integrated circuits. Signal multiplexing may be accomplished in a variety of different ways including time multiplexing. These techniques are known to those skilled in the art. Focus motors such as 44 and tracking motors such as 50 are also generally known. In one embodiment, all optical elements of disk drive 10 including objective lens 20 and detector 22 are mounted to a rotary arm (not shown). The rotary arm is pivotally mounted adjacent disk 12. In response to the tracking drive signals, tracking motor 50 drives the rotary arm and objective lens 20 with respect to disk 12. Focus motor 44 drives the objective lens with respect to the rotary arm and disk 12. The rotary arm, focus motor 44 and tracking motor 50 of this embodiment are described in greater detail in co-pending application Ser. No. 246,776, filed Sep. 20, 1988, now U.S. Pat. No. 4,977,549, entitled "BIAS FIELD SWITCHING MEANS FOR A MAGNETO-OPTIC DISK DRIVE" which is specifically incorporated herein by reference, for all that it teaches.

In disk drives using grooved optical disks 12 such as that shown in FIG. 3, the Focus Error Signal" (FES) is composed of not only the true error signal, but also a focus error crosstalk component 7. This focus error crosstalk component 7 is the result of portions of light beam 18 reflected from the land portion 4 of disk 12 combining with phase shifted portions of the light beam reflected from grooves 6. The result is diffraction patterns which impinge on the detectors. The present invention includes a method for attenuating the crosstalk induced component 7 of the focus error signal 11, and the errors it introduces into the focus servo system.

Figure 5:
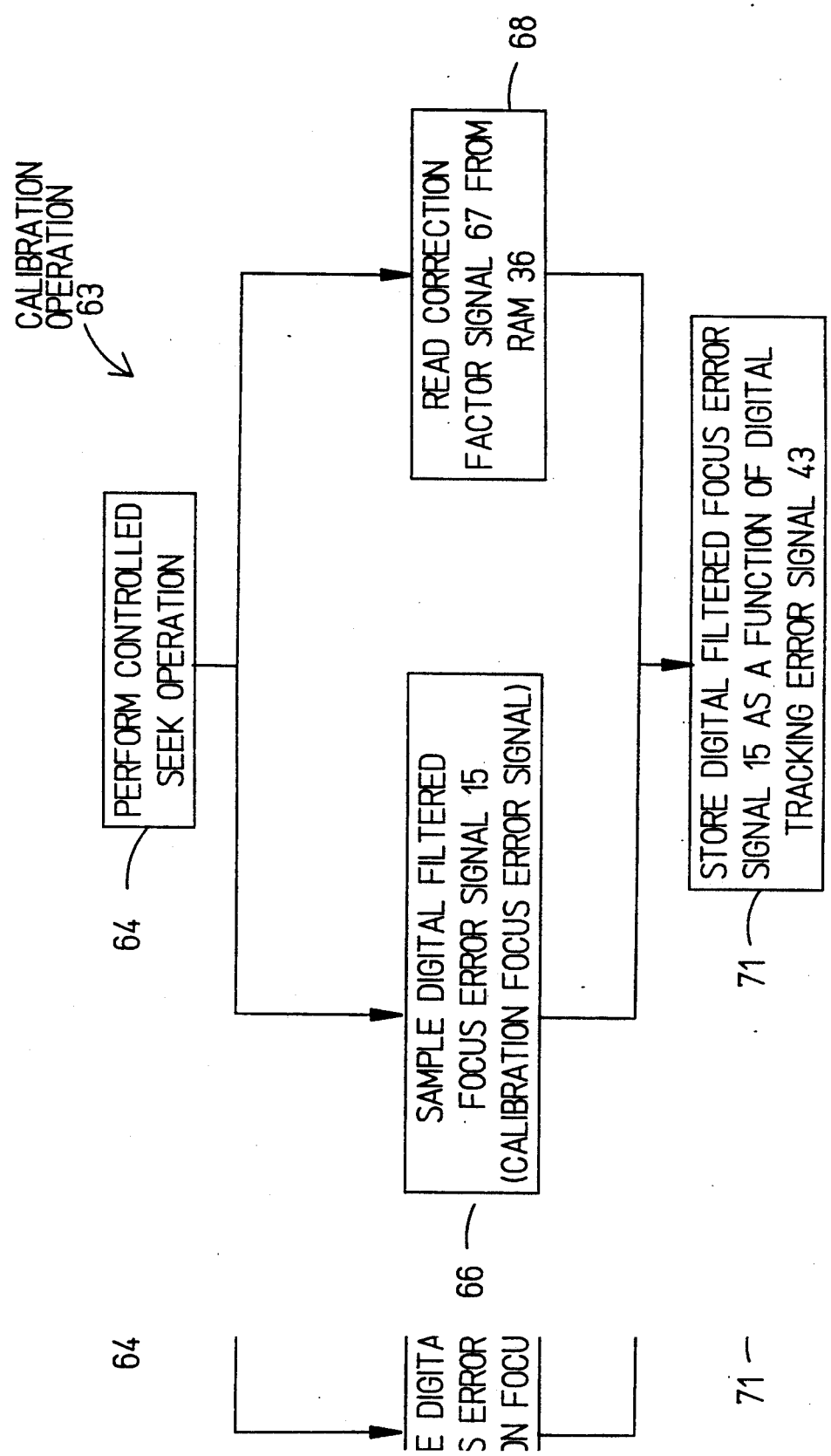
FIG. 5 is a flow chart illustrating the sequence of steps performed by a digital signal processor in accordance with the present invention to determine the crosstalk induced error signal for the particular media.
Figure 6:
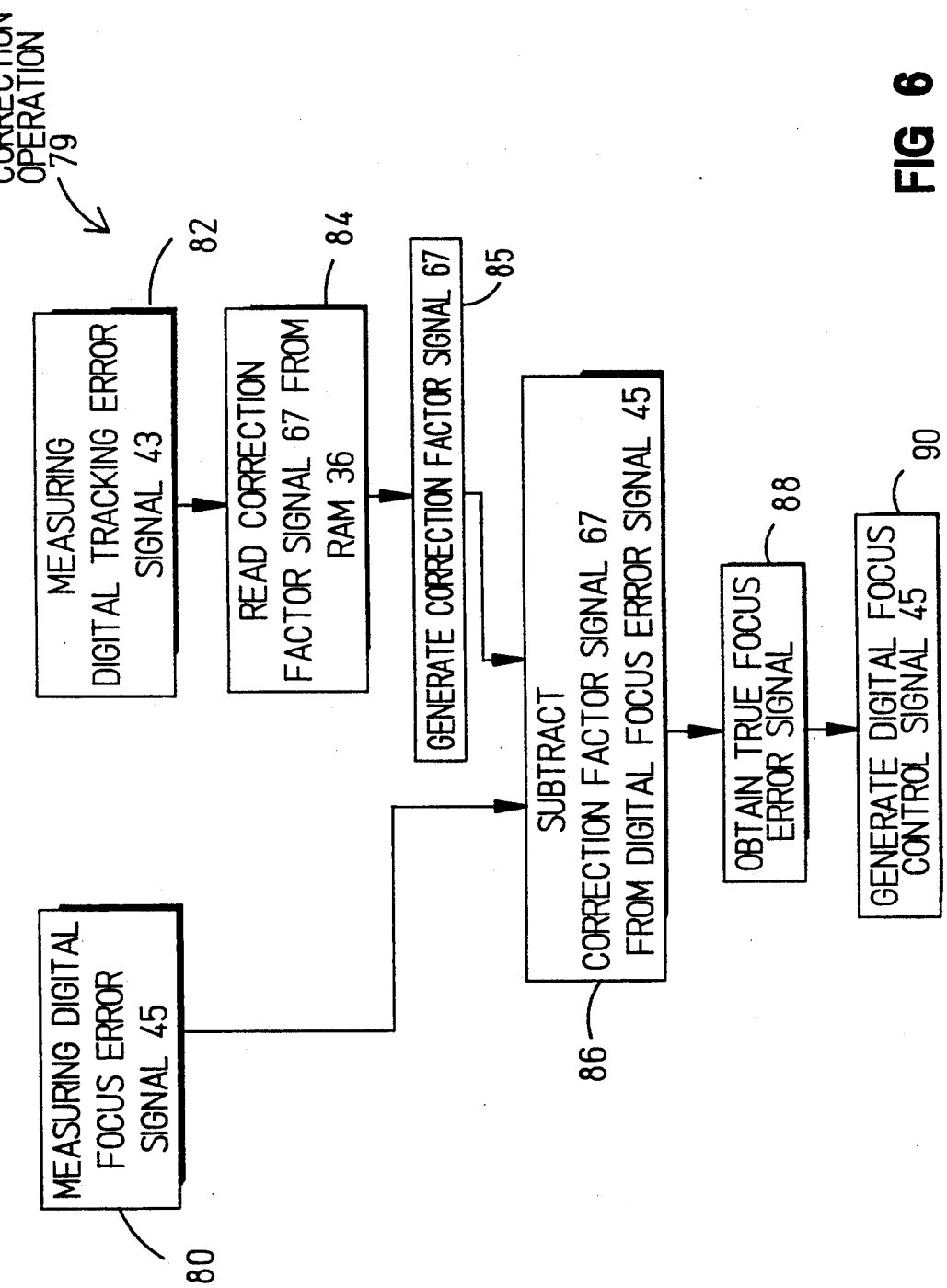
FIG. 6 is a flow chart illustrating the sequence of steps performed by the digital signal processor in accordance with the present invention to correct for optical crosstalk in the focus error signal.

FIG. 5 shows the steps involved in a calibration operation 63 which together with a correction operation illustrated in FIG. 6 form a method of obtaining a true error focus signal. The purpose of the calibration operation is to generate a table of data characterizing the crosstalk induced component 7 of the focus error signal 11 as a function of the tracking error signal (TES) 1. In FIG. 4 this is accomplished in digital signal processor 34 by generating a correction factor signal 67 in the form of a table that is stored in RAM 36 that is generated from the digital tracking error signal 43 and digital filtered focus error signal 15. The correction technique uses this calibration data to remove the crosstalk component from the FES during normal drive operation.

In general, the steps involved in the calibration technique are to perform a controlled seek operation 64, a sampling operation 66 during which the digital filtered focus error signal 15 is sampled, a sampling operation 68 during which the digital tracking error signal 43 is sampled, and a store operation 71 during which the correction factor signal 67 is saved in a lookup table in RAM 36 as a function of corresponding values of digital tracking error signal 43. The calibration technique can be performed for each new disk 12 at the time of insertion into drive 10 and when monitored read or write error rates become too high.

After a new disk 12 is placed in the optical disk drive 10, and before the calibration technique 63 illustrated in FIG. 5 can be performed, the proper operating conditions of the laser (e.g., power levels) must be set, and an initial rough focus must be captured. During an initial, rough focus capture routine controlled by digital signal processor 34, the focus servo loop is opened (disabled) and the objective lens 20 is positioned so that optical beam 18 is sufficiently focused on the recording surface of disk 12 to enable the optical detector 22 to produce signals representative of servo tracks 14 (i.e., land portions 4 and groove portions 6 in FIG. 3). Once the objective lens 20 is positioned within the focus capture range of the focus servo loop, the focus servo loop is closed (enabled) and focus is captured, as set forth below. The focus servo system maintains focus capture during drive operation in the closed loop mode.

Before generating a calibration table in RAM 36 from correction factor signal 67, a filtered focus error signal 41 must be generated that is made up of only the crosstalk induced component 7 of focus error signal 11 and devoid of any "true" focus error component. This is done by increasing the rate the light beam 18 and objective lens 20 are driven across servo tracks 14. As shown in FIGS. 1 and 2, both the tracking error signal 1 and the crosstalk induced component 7 of the focus error signal 11 are illustrated as a function of lens position. As the track crossing rate of light beam 18 is increased, the frequencies of tracking error signal and the focus error signal increase. However, the mechanical servo system used to focus the lens 20 is limited in its response time and is, therefore, said to have a predetermined bandwidth. In other words, the mechanical servo system for moving lens 20 in direction 54 (FIG. 4) will not respond quickly enough to induce a noticeable correction in the focus error signal 11. So, if the track crossing rate is made high enough, the frequency of focus error signal 11 will be above the bandwidth of the focus servo loop. A small bandpass filter is used as the crosstalk filter 56 so that only the amplitude variations of 60+64 versus 62+66 are emitted by crosstalk filter 56 at the track crossing rate. The amplitude variations of the crosstalk induced component 7 of the focus error signal (calibration focus error signal) can then be mapped to the amplitude variations of the tracking error signal (calibration tracking error signal), so that for each amplitude value of the calibration tracking error signal, an amplitude value is recorded for the calibration focus error signal.

Referring to FIG. 5, the first step in the calibration technique is the controlled seek operation 64. This step is performed with the focus servo loop operating in the closed loop mode, and involves activating the tracking motor 50 and driving or scanning beam 18 and lens 20 at a track crossing rate greater than the focus closed loop bandwidth or the inverse of the response time of the focus servo system. In one particular embodiment, the focus servo closed loop bandwidth is 2 to 4 kilohertz and the controlled seek is done at 10 kilohertz (i.e., at least 2.5 times greater than the closed loop bandwidth). Because the tracking error signal frequency (i.e., the calibration frequency) is above the bandwidth of the focus servo loop, the focus crosstalk signal will also have a frequency above the bandwidth of the focus servo loop. As a result, crosstalk filter 56 is designed to have a bandpass frequency to filter amplitude variations that have a calibration frequency that corresponds to the track crossing rate. In this manner, crosstalk filter 56 removes the foc (y) term of equation 2 leaving only the crosstalk component (sin term), i.e., the filtered calibration focus error signal. Since the focus servo system does not appreciably respond to frequencies beyond its bandwidth, there is no "true" focus error component (foc y term in Equation 2) of the focus error signal, leaving only the crosstalk induced component 7 (sin term) of the focus error signal (filtered calibration focus error signal). The crosstalk induced component 7 can be directly measured during the controlled seek operation 64.

Referring again to FIG. 4, MUX 58 is controlled by digital signal processor (DSP) 34 and selects the filtered focus error signal 41 when performing controlled seek operation 64. As the controlled seek operation 64 is performed, the normalized focus error signal 37 from MUX 30 is passed through crosstalk filter 56 that comprises a bandpass filter as set forth above. The filter 56 isolates the crosstalk induced component 7 of the focus error signal before the ADC 32 provides the digital signal processor 34 with a binary representation of the sign and magnitude of the crosstalk induced component 7 of the focus error signal 11.

In FIG. 5, the sampling of the digital tracking error signal 43 (calibration tracking error signal) during sampling operation 68 of calibration operation 63 is performed simultaneously with the sampling of the digital filtered focus error signal 15 (calibration focus error signal) during operation 66 of calibration operation 63. Referring to FIG. 4, ADC 32 receives the normalized tracking error signal 39 from MUX 30 and converts this analog signal into a binary or digital signal required by the digital signal processor 34. Sampling operation 68 (FIG. 5) is responsive to a number of different discrete voltage levels. As the normalized tracking error signal 39 reaches these discrete voltage thresholds, a binary representation of the sign and magnitude of the normalized tracking error signal 39 is sent to digital signal processor 34. Sampling can also occur at a series of predetermined times.

As shown in FIG. 4, ADC 32 receives the filtered focus error signal 41 (i.e., the crosstalk induced component 7) from MUX 58 and converts this analog signal to a binary form during sampling operation 66 (FIG. 5). Again, sampling operation 66 takes place concurrently with sampling operation 68. As a result, values of the digital filtered focus error signal 15 (i.e., the crosstalk induced component 7 of the focus error signal 11) are generated as a function of corresponding values of the digital tracking error signal 43.

In one embodiment, the digital tracking error signal 43 is converted into N discrete steps for both the positive and negative polarity portions of the digital tracking error signal 43. As a result, a set of 2N corresponding values of the digital tracking error signal 43 and crosstalk induced component 7 of the focus error signal 11 are generated. The 2N discrete values of digital tracking error signal 43 do not have to be in equal increments of its magnitude. Because the magnitude of the tracking error signal is small during normal operation (ideally zero when there is no tracking error), higher resolution and accuracy can be obtained by generating a greater number of values adjacent the linear portion of the tacking error signal which are representative of small tracking errors.

The next step in the calibration technique 63 of FIG. 5 is the generation of a correction factor signal 67. This is done by creating a logical calibration table, or lookup table, in RAM 36 (FIG. 4). This logical calibration table in RAM 36 stores the samples of discrete values of digital filtered focus error signal 15 (calibration focus error signal) at address locations corresponding to the samples of the discrete values of digital tracking error signal 43 (calibration tracking error signal) sampled during the sampling operations 66 and 68 described above in FIG. 5. The DSP 34 may average several samples taken in sampling operations 66 and 68 to obtain a more representative sample and thereby reduce the effects of noise on the correction factor signal 67. Because both the tracking error signal and the crosstalk induced component 7 of the focus error signal 11 are approximated by sin functions, it is only necessary to store sampled values corresponding to one cycle of the tracking error signal. DSP 34 stores the correction factor signal 67 in RAM 36, as illustrated by step 71 of FIG. 5, for later reference during the correction operation 79, illustrated in FIG. 6.

FIG. 6 shows the correction operation 79 of the present invention. The correction operation 79 is used during normal closed loop servo operation of disk drive 10 such as during reading or writing of the optical disk 12. Referring to FIG. 4, normalized tracking error signal 39 and normalized focus error signal 37 from the AGC circuits 28 are selected by MUX 30 under control of the DSP 34 through MUX control signal 35 and are supplied to the ADC 32 for conversion into binary values as digital tracking error signal 43 and digital focus error signal 45, respectively. These signals are measured during operations 80 and 82 at a rate of 10 to 20 times faster than the operating open loop bandwidth of the focus servo loop. Operations 80 and 82 take place as close together in time as possible to keep skew induced errors to a minimum.

For each value of digital tracking error signal 43 that is detected during the measuring operation 82, a corresponding correction factor signal 67 is read from RAM 36 during operation 84. RAM 36 operates as a lookup table such that discrete values of the digital tracking error signal 43 are measured during the correction operation 79. These discrete values of the digital tracking error signal represent addresses in RAM 36 where values of the calibration focus error signal are stored. RAM 36 produces the discrete values of the calibration focus error signal at its output as successive addresses are applied to RAM 36. These successive output values produce a correction factor signal 67 at step 85 of FIG. 6. The correction factor signal 67 read from the RAM 36 is then subtracted from digital focus error signal 45 by the DSP 34 during the subtraction operation 86. A corrected or "true" focus error signal from which the crosstalk induced error component has been removed is then obtained at step 88. Closed loop gain compensation techniques previously discussed can then be performed to generate a digital focus control signal 45.

The present invention is an adaptable and cost effective method for attenuating optical crosstalk. Because the crosstalk induced component 7 of the focus error signal 11 is directly measured during the calibration procedure, this method of optical crosstalk attenuation is not dependent on a specific vendor for the disk media or a specific process used by the vendor of the disk media. It can be quickly implemented in the drive. Recalibration also allows compensation for temperature effects, aging effects and media contamination which all affect the focus error crosstalk component. The recalibration technique used in the present invention can be done under the control of the signal processing means without any special equipment or service technician's time which is a significant advantage over the prior art which required costly alignment and calibration techniques.

Although the present invention has been described with reference to preferred embodiments, workers skilled in the art will recognize that changes may be made in form and detail without departing from the spirit and scope of the invention.

We claim:

1. An optical disk drive having a focus servo system and a tracking servo system for controlling focus and tracking of said optical disk drive comprising:

detector means for generating detector signals in response to optical signals from an optical disk;

summing circuit means for generating a tracking error signal and a focus error signal from said detector signals;

crosstalk filter means for filtering said focus error signal to produce a filtered calibration focus error signal during a calibration phase of said optical disk drive, said crosstalk filter means having a lower cutoff frequency greater than the inverse of the response time of said focus servo system;

means for generating a correction factor signal from said filtered calibration focus error signal as a function of said tracking error signal;

means for modifying said focus error signal by said correction factor signal to attenuate crosstalk induced components in said focus error signal.

2. The optical disk drive of claim 1 wherein said means for generating a correction factor signal comprises:

means for sampling said filtered calibration focus error signal to produce a series of filtered calibration focus error signal samples;

means for sampling said tracking error signal during said calibration phase to produce a series of tracking error signal samples;

means for storing said filtered calibration focus error signal samples as a function of said tracking error signal samples;

means for retrieving said filtered calibration focus error signal samples as a function of said tracking error signal samples to produce said correction factor signal.

3. The optical disk drive of claim 2 wherein said means for modifying comprises:

means for subtracting said correction factor signal from said focus error signal to produce a true focus error signal having optically induced crosstalk components attenuated.

* * * * *